Feb. 6, 1951 B. E. FRANK ET AL 2,540,166
MACHINE FOR CUTTING TUBING
Filed Aug. 27, 1949 6 Sheets-Sheet 1

INVENTORS
BERNARD E. FRANK
JOHN W. ARMSTRONG
BY
Their ATTORNEYS

Patented Feb. 6, 1951

2,540,166

UNITED STATES PATENT OFFICE 2,540,166

MACHINE FOR CUTTING TUBING

Bernard E. Frank and John W. Armstrong, Rochester, N. Y., assignors to General Motors Corporation, Detroit, Mich., a corporation of Delaware Application August 27, 1949, Serial No. 112,793

7 Claims. (Cl. 164—48)

This invention relates to apparatus for cutting tubing into lengths and its object is to provide apparatus for operating upon continuously moving tubing for cutting it into uniform lengths without stopping movement of the tubing.

In the disclosed embodiment of the invention, the length of the tubing to be cut from the supply is determined by the distance between the cutter and an abutment member engaged by the free end of the tubing. The cutter and member move with the tubing at the same rate of speed and while so moving the tubing is cut. The abutment member has a lost motion connection with the cutter frame. The tubing first moves the abutment member without moving the cutter; and, during said movement a servo is caused to start motion of the cutter in the direction of tubing movement. Then the abutment member picks up the cutter, and cutter tubing and abutment member move as a unit; and, during this movement, the cutter is caused to operate. The apparatus provides for ejection of the cut lengths of tubing and the return of the cutter and abutment member to a starting position.

Further objects and advantages of the present invention will be apparent from the following description, reference being had to the accompanying drawings wherein a preferred embodiment of the present invention is clearly shown.

In the drawings:

Fig. 1 is a fragmentary side view of the apparatus embodying the invention;

Fig. 2 is a sectional view on line 2—2 of Fig. 1;

Fig. 3 is a view in the direction of arrow 3 of Fig. 1;

Fig. 4 is a fragmentary sectional view on line 4—4 of Fig. 1;

Figs. 5 and 6 are fragmentary side views forming continuation to the right of Fig. 1;

Figs. 7 and 8 are sectional views taken respectively on lines 7—7 and 8—8 of Fig. 5;

Fig. 9 is a view drawn to a larger scale than Figs. 1, 5 and 6, and shows a fragment of a side portion of the apparatus which will be located to the right of the fragment shown in Fig. 6;

Figs. 11, 12 and 13 are sectional views taken respectively on lines 11—11, 12—12 and 13—13 of Fig. 9;

Fig. 15 is a view of the cutter in the direction of arrow 15 of Fig. 14;

Fig. 17 is a sectional view on line 17—17 of Fig. 15;

Fig. 18 is a sectional view on line 18—18 of Fig. 15;

Fig. 19 is a sectional view on line 19—19 of Fig. 14;

Figures 1, 2, 3, 4:
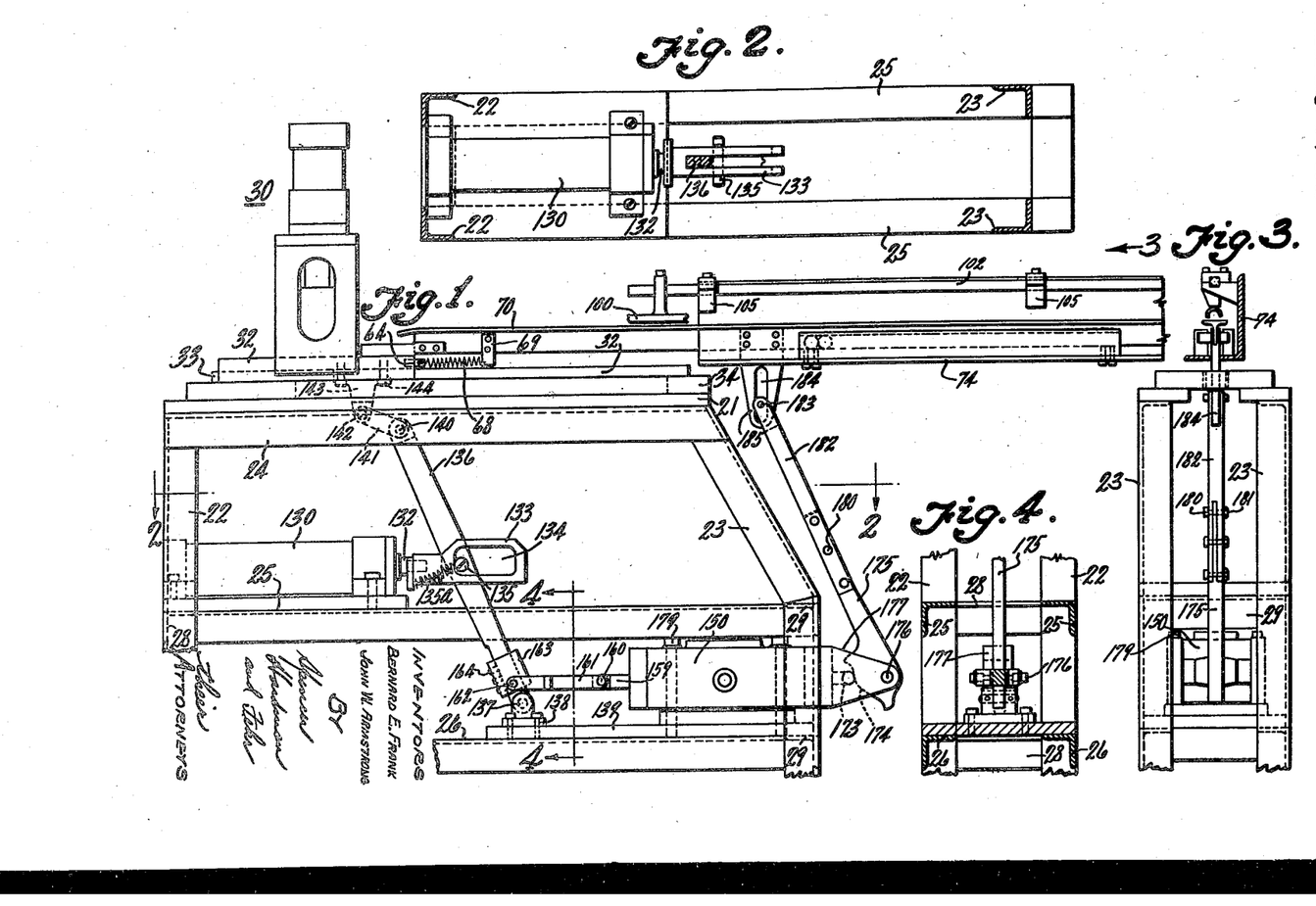

Referring to Figs. 1 to 4, a table 21 is supported by a framework comprising two legs 22 and two legs 23 joined by two each of angles 24, 25 and 26 and by shorter angles 28 at the left and 29 at the right in Fig. 1.

Figure 18:
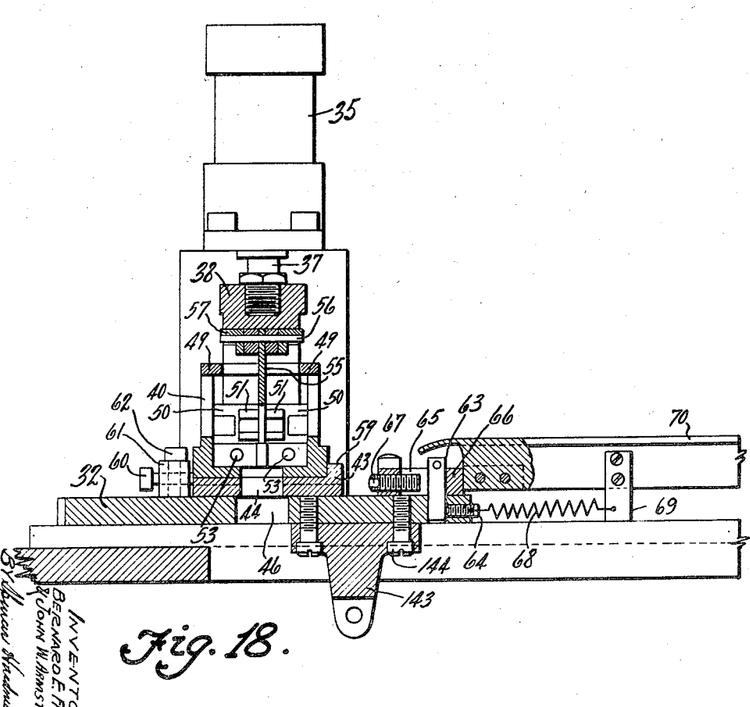
Figure 19:
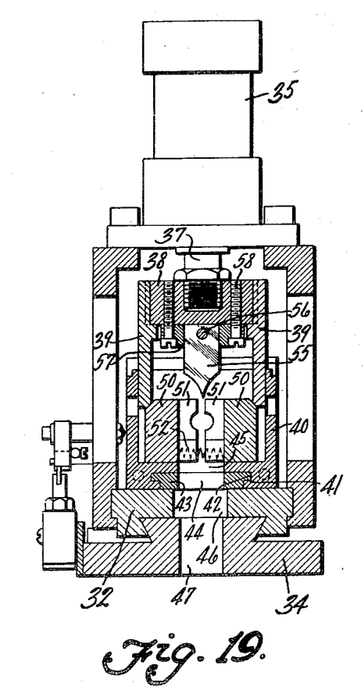

Referring to Figs. 14 through 19, a cutter assembly 30 comprises side plates 31 (Fig. 15) attached to a base 32 which is guided for horizontal movement by a dovetail bar 33 attached to a plate 34 which is fixed to the table 21 in Fig. 1. The plates 31 support a cylinder 35 receiving a piston 36 (Fig. 20) connected by rod 37 which, as shown in Figs. 18 and 19, is attached to a block 38 which supports bars 39 and are movable between the sides of a frame 40, the base of which has grooves 41 receiving the tongues 42 of a block 43 attached to base 32 and providing an aperture 44 in alignment with an aperture 45 in frame 40, a hole 46 in base 32 and an elongated hole 47 in plate 34. The bars 39 are movable also between plates 49 attached to frame 40. Frame 40 guides for horizontal movement transverse to the direction of movement of the tubing 2, blocks 50 each provided with a pair of clamping jaws 51 adapted to engage the tubing. These jaws are urged apart by spring 52 received by sockets 53 in these blocks (Fig. 18). Downward movement of the piston in cylinder 35 causes the bars 39 to force the clamping blocks 50 toward each other to grip the tubing while the tubing is cut by blade 55, movable between the jaws 51, said blade being attached by a pin 56 to a plate 57 which screws 58 attach to block 38. The cutter shavings gravitate through holes 44, 45, 46 and 47.

Frame 40 is clamped against a lug 59 of plate 43 by a screw 60 threaded through a bar 61 which screws 62 attach to base 32.

Base 32 has a lost motion connection with a T-bar 70 which extends nearly the full of the machine. This lost motion connection is provided by a pin 63 which a set screw 64 attaches to base 32, said pin being received by a slot 65 in a bar 66, attached to T-bar 70. The amount of lost motion can be varied by adjusting the screw 67 threaded through bar 66. The lost motion is taken up in one direction by a spring 68 attached to screw 64 and to a clip 69 attached to T-bar 70, said spring operating to urge the T-bar 70 toward the left so that the right end wall of the slot 65 engages the pin 63.

Figures 5, 6, 7, 8:
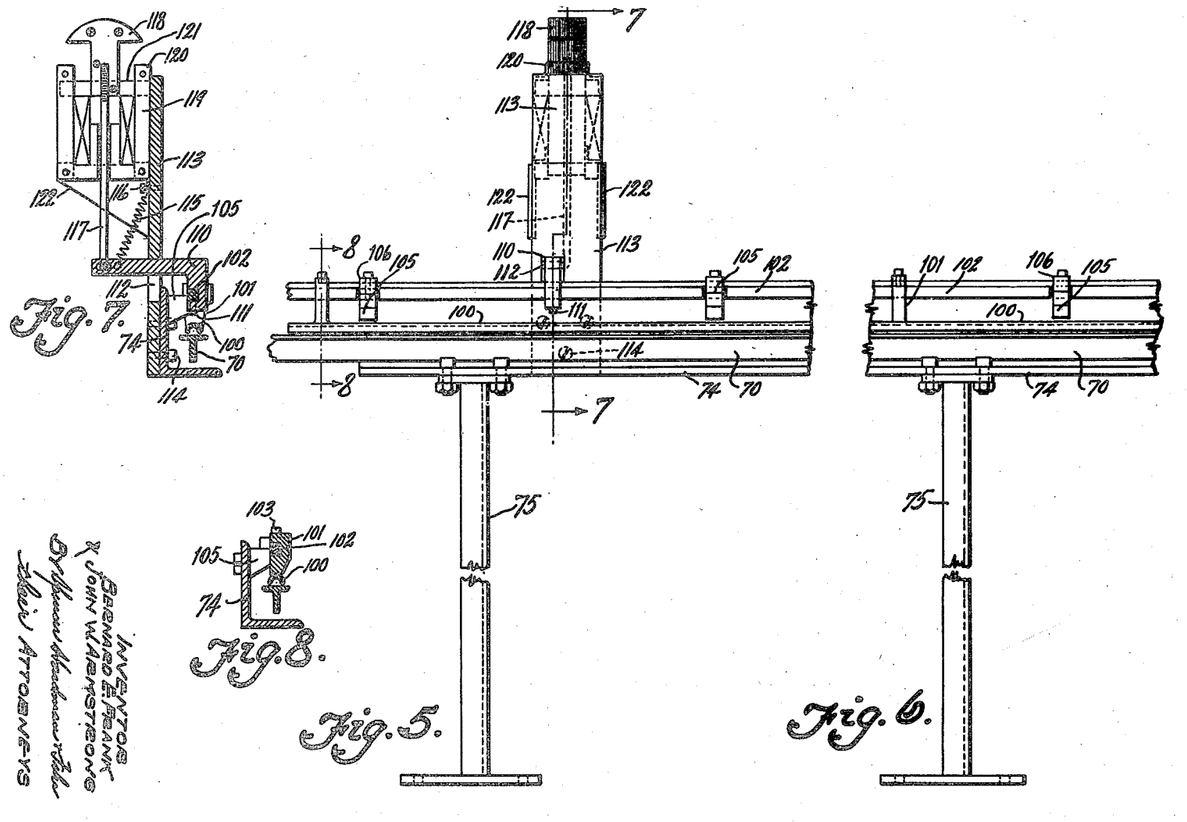
Figure 11:
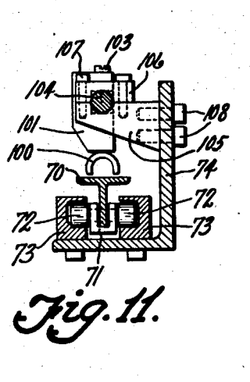

Referring to Fig. 11, T-bar 70 is attached at intervals along its length to U-brackets 71 which support rollers 72 received by rails 73 attached to the bottom flange of an angle bar 74 which is supported above the floor by several posts 75 as shown in Figs. 5 and 6.

Figures 9, 12, 13:
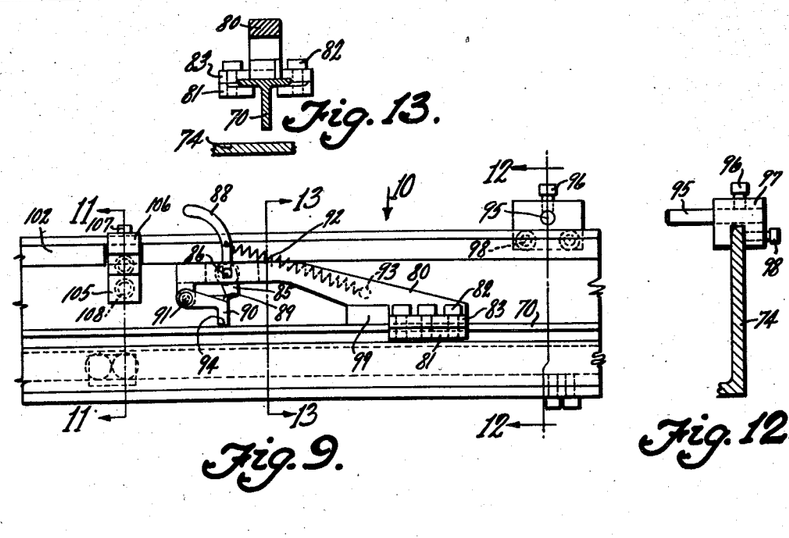
Figure 10:
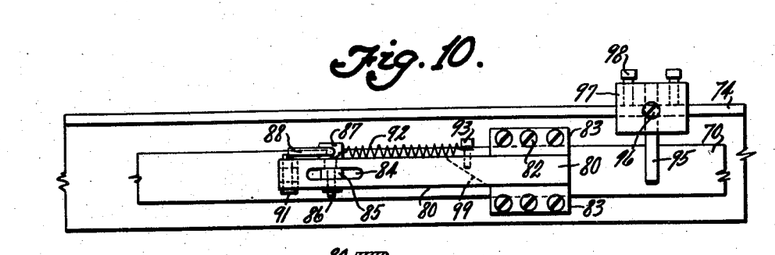
Fig. 10 is a view in the direction of arrow 10 of Fig. 9.

Referring to Figs. 9 and 10, the T-bar 70 supports a bracket 80 supported by the horizontal upper flanges of the T-bar and secured thereto by clamp plates 81 threadedly engaged by screws 82 passing through holes in horizontal side flanges 83 of bracket 80. Bracket 80 provides an oblong hole 84 which receives a lever 85 pivoted on a shaft 86 which extends across the hole and which provides the hub 87 of a curved lever 88. The lever 85 is provided at its lower left hand corner (Fig. 9) with a notch 89 which receives a corner of an abutment lever 90 pivoted on a pin 91 supported by bracket 80. Lever 90 serves as an abutment member engaged by tubing which travels to the right toward the T-bar 70. Normally the lever 90 rests upon the T-bar and is held there by the lever 85 which is urged clockwise by a spring 92 attached to lever 88 and to a pin 93 attached to bracket 80. The free end of the tubing which moves toward the right will engage the lever 90 and cause movement of the T-bar 70 to the right thereby causing the lever 88 to move into engagement with a rod 95 attached by screw 96 to a block 97 (Fig. 12) which screws 98 clamp to the vertical flange of angle bar 74. Block 97 is adjustable along the bar 74 so as to locate the rod 95 in the proper relation to the lever 88. The right movement of T-bar 70 will therefore cause the lever 88 on the lever 85 to be cammed counterclockwise to free the lever 90 which by virtue of engagement with the moving tubing is caused to move counterclockwise to free the tubing which can then pass underneath the beveled surface 94 of the lever 90. Bracket 80 has a beveled surface 99 which the tubing may engage at the time it is being ejected.

The tubing is ejected toward the observer viewing Fig. 9 and to the left of the T-bar 70 in Fig. 11. Inverted U-shaped members 100 are attached to levers 101 which, as shown in Fig. 8, are notched to receive a square shaft 102 and are clamped thereto by screws 103. Shaft 102 has cylindrical portions 104 (Fig. 11) journaled in bearings provided by brackets 105 and bearing caps 106 attached by screws 107 to the brackets, said brackets being attached to the angles 74 by screws 108.

Referring to Figs. 5 and 7, the shaft 102 is received by a notch in a lever 110 which is secured to the shaft by a screw 111. Lever 110 extends through a hole 112 in a plate 113 which screws 114 attach to angle 74. A spring 115, attached to lever 110 and to a pin 116 attached to plate 113, urges lever 110 clockwise into engagement with the upper surface of hole 112 thereby locating the ejecting members 100 in normal position as shown in Figs. 7, 8 and 11. Lever 110 is attached by rod 117 to an armature 118 of a solenoid 120 having a magnetizable frame 119 supported by brackets 121 and 122 provided by a plate 113.

The engagement of the tubing with the abutment lever 90 (Fig. 9) starts T-bar 70 moving right in Fig. 1. However, motion of the cutter to the right is not initiated by movement of T-bar 70 but is initiated by hydraulic means comprising a cylinder 130 containing a piston 131 (Fig. 20) and connected by a rod 132 with a plate 133 having slot 134 which receives a pin 135 urged to the left end of the slot by a spring 135a connected with the pin and the rod 132. Pin 135 is attached to a lever 136 pivoted on a pin 137 supported by a bracket 138 attached to a plate 139 supported by the lower angle bar 26. The upper end of the lever 136 carries a pin 140 connected by a link 141 with a pin 142 carried by a bracket 143 which screws 144 (Fig. 18) attach to the base or carriage 32 which supports the cutter 30.

Figure 20:
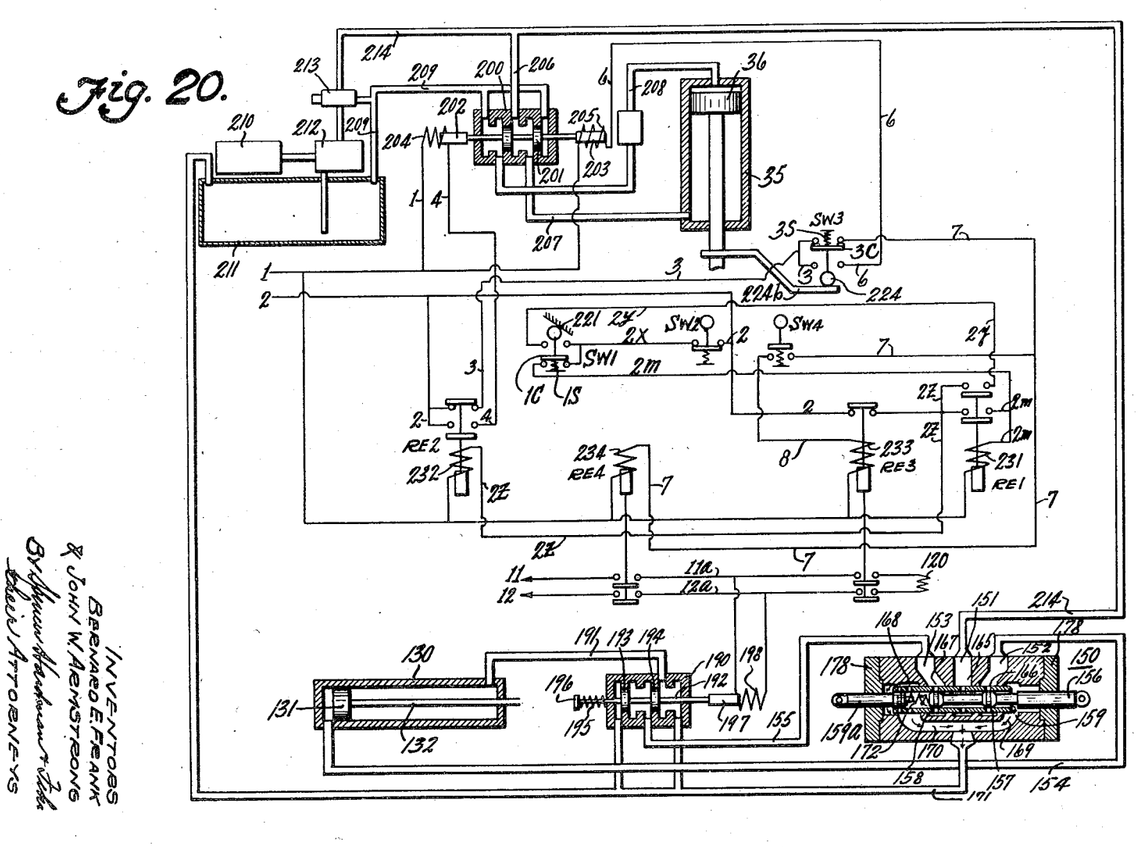
Fig. 20 is an hydraulic and wiring diagram of the apparatus.

The cutter 30 is started moving right by virtue of right movement of plate 133 connected with rod 132, connected with the piston 131 in cylinder 130. Admission of pressure fluid at the left end of cylinder 130 is controlled by a servo valve 150 (Fig. 20) having an inlet duct 151 connected with a source of pressure fluid to be described and having distributing ducts 152 and 153 connected respectively with pipes 154 and 155. Pipe 154 is connected with the left end of cylinder 130, in a manner to be described. Pipe 155 is connected by a valve 190 and a pipe 191 with the right end of the cylinder 130. The valve 150 includes a spool valve 156 having lands 157 and 158 and slidable within a follow up sleeve valve 159 connected by rod 159a, pin 160, link 161 and pins 162 with a block 163 which can be adjusted along the lever 136 and secured by screws 164. The sleeve valve 159 has a pressure fluid inlet port 165, outlet ports 166 and 167, and a drain port 168. When the valve members 156 and 159 are in equilibrium position as shown in Fig. 20, there will be some leakage of pressure fluid, as indicated by the arrows 169, into a duct 170 which is connected with a drain pipe 171. A spring 172 located between rod 159a and spool valve 156 urges the spool valve 156 toward the right so that a cam follower 173 (Fig. 1) on the right end of spool valve 156 will engage a cam 174 integral with a lever 175 pivoted on a rod 176 supported by a bracket 177 which is provided by one of the cover members 178 of the valve 150. As shown in Fig. 1, valve 150 is secured by screws 179 to the plate 139. Lever 175 is attached by screw 180 and nuts 181 (Fig. 3) to an extension 182 carrying a pin 183 received by a slot 184 in a bracket 185 attached to the T-bar 70.

Valve 190 (Fig. 20) includes a movable spool valve 192 having lands 193 and 194 normally positioned, as shown by a spring 195, located between the valve body and a washer 196 attached to the stem of valve 192. Valve 190 therefore normally connects pipe 191 with pipe 171 and blocks connection between pipe 155 and pipe 191. Hydraulic fluid leaking to the left past the land 193 can escape to pipe 171. Spool valve 192 is connected with the solenoid armature 197 which is moved to the right against the action of spring 195 when a solenoid coil 198 is energized.

The admission of pressure fluid to the ends of cylinder 35 is under control by valve 200 having a movable spool valve 201 connected with solenoid armatures 202 and 203 under control by solenoid coils 204 and 205 respectively. When spool valve 201 is in the position shown, a pipe 206 connected with a source of pressure fluid is connected with the lower end of cylinder 35 through pipe 207 while the upper end of the cylinder is connected by a pipe 208 with drain pipe 209. When coil 205 is deenergized and coil 204 is energized, spool valve 201 moves to the left to connect pipe 206 with pipe 208 connected with the upper end of cylinder 35, while the lower end of the cylinder is connected with drain through pipes 207 and 209. Therefore, when coil 204 is energized and coil 205 is deenergized the piston 36 moves down to effect the clamping of the tubing and the cutting thereof; and, vice versa, when the coil 204 is deenergized and coil 205 is energized, the piston 36 moves up to retract the shear blade and to unclamp the tubing.

An electric motor 210 mounted on a tank 211 containing hydraulic fluid drives a pump 212 which withdraws fluid from the tank and forces it through a pressure relief valve 213 to pipe 214 connected with pipe 206 and with the inlet duct 151 of valve 150. When fluid pressure exceeds a certain value, valve 213 connects the pump outlet with pipe 209 which returns fluid to the tank.

Figures 14, 16:
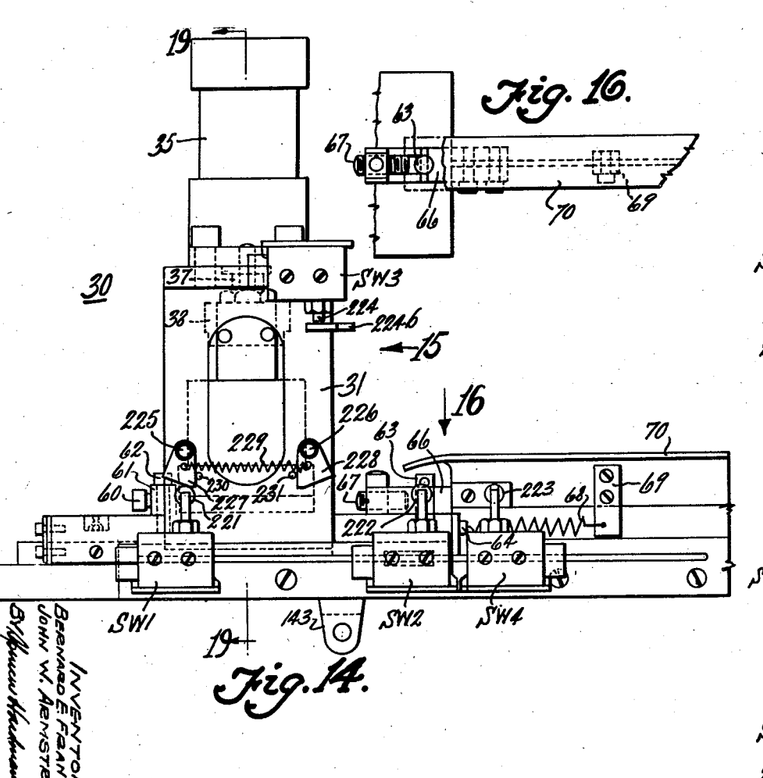
Fig. 14 is a side view of the cutter on a larger scale than Fig. 1.
Fig. 16 is a view in the direction of arrow 16 of Fig. 14.
Figures 15, 17:
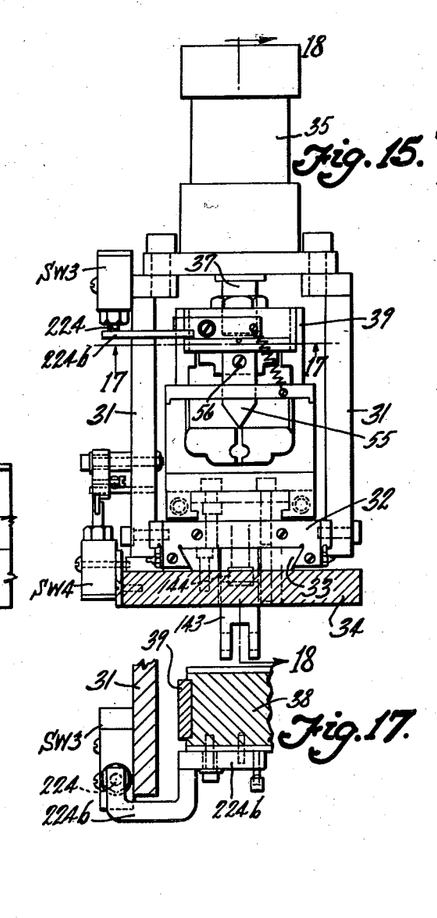

The solenoid coils of the valves 190 and 200, and the ejector solenoid coil 120 are parts of the electrical system of control which includes switches SW1, SW2 and SW4 attached, as shown in Figs. 14 and 15, to plates 34 and a switch SW3 attached to a plate 31 of cutter 30. These switches have actuators 221, 222, 223 and 224 respectively. One plate 31 of the cutter carries pins 225 and 226 pivotally supporting cams 227 and 228 connected by a spring 229 which urges these cams respectively counterclockwise and clockwise against stop pins 230 and 231 respectively. Switch SW1 has a movable contact 1C which is held down against the action of a spring 1s to connect wires 2x and 2m (Fig. 20) when the cutter 30 is in the position shown. As the cutter moves right it retracts cam 227 from actuator 221. Spring 1s moves contact 1c up to break connections between wires 2x and 2m and to make the connection between 2m and 2y.

Switch SW2 is a normally closed switch connecting wires 2 and 2x. When opened by engagement of cam 228 with actuator 222 for a period during right movement of cutter 30, wires 2 and 2x are disconnected. Switch SW4 is a normally open switch which is caused to be moved down by engagement of cam 228 with actuator 223 to connect wires 7 and 8.

Switch SW3 has a contact 3c which is held up against the action of spring 3s to connect wires 3 and 7 due to the engagement of its actuator 224 with a bar 224b which, as shown in Figs. 14, 15 and 17, is attached to the block 38. Therefore, while piston 36 is uppermost, wire 3 is connected with wire 7 but disconnected from wire 6. Downward movement of piston 36 permits spring 3s to move contact 3c downward to disconnect wires 3 and 7, and to connect wires 3 and 6.

Switches SW1, SW2, SW3 and SW4 control the circuits of coils 231, 232, 233 and 234 of relays RE1, RE2, RE3 and RE4.

While coil 231 of relay RE1 is not energized no connections are made by this relay but when coil 231 is energized wires 2y and 2m are connected with wire 2z.

When coil 232 is not energized relay RE2 connects wires 2 and 3 and when coil 232 is energized wire 2 is disconnected from wire 3 and is connected with wire 4.

When coil 233 of the relay RE3 is not energized wires 2 and 2z are connected and when coil 233 is energized wire 2 is disconnected from wire 2z and eject solenoid coil 120 is connected with wires 11a and 12a.

When coil 234 of relay RE4 is energized current source wires 11 and 12 are connected with wires 11a and 12a, respectively with which coil 198 is connected.

Wires 1 and 2 and wires 11 and 12 are connected with suitable current source.

The operation of the control system is as follows: When the cutter 30 is in the left or normal position shown in Fig. 14, switch SW1 connects wires 2m and 2x. Therefore, coil 231 of relay RE1 is energized through the following circuit: wire 1, coil 231, wire 2m, switch SW1, wire 2x, switch SW2, wire 2. Relay RE1 then connects wire 2z with the wires 2y and 2m. Coil 231 of relay RE1 is then connected with wires 1 and 2 through a circuit independent of switches SW1 and SW2, namely, wire 1, coil 231, wire 2m, wire 2z, upper contacts of relay RE3, wire 2. Therefore, the circuit of coil 231 is maintained independently of switches SW1 and SW2 until coil 233 of relay RE3 is energized to disconnect wires 2 and 2z.

When the tubing which moves right engages the stop lever 90 (Fig. 9) and causes the T-bar 70 to move right, before lost motion is taken up between screw 67 and pin 63 (Fig. 18), lever 175 (Fig. 1) has been moved by the T-bar clockwise sufficiently to cause movement of spool valve 156 (Fig. 20) to the right relative to the sleeve 159 thereby causing admission of pressure fluid to the left end of the cylinder 130 to cause right movement of piston 131 and bar 133 and thereby starting the right movement of the cutter 30 in advance of movement of the cutter by the T-bar 70 which is moved by the tubing. This feature is important on account of the inertia of the cutter. The tubing would buckle if it had the duty of initiating cutter movement. The T-bar 70, which is traveling at the rate of speed of the tubing, actually moves at a rate faster than the rate of the right movement of the cutter when moved by the piston 131 so that the cutter 30 does not push the T-bar but is pulled thereby by virtue of engagement of screw 67 (Fig. 18) with pin 63. The tubing can perform, without buckling, the function of accelerating the movement of the cutter. Therefore the cutter, tubing and abutment member 90 and T-bar 70 move as a unit for a time during which the tubing is clamped and cut. The clamping and cutting operations take place immediately after the cutter 30 has been moved by the moving tubing to the right (Fig. 14) sufficiently to allow switch contact 1c to break connection between wire 2x and 2m and to make connection between wire 2x and wire 2y. When this occurs coil 232 of relay RE2 is energized through the following circuit: wire 1, coil 232, wire 2z, closed contacts of relay RE1, wire 2y, switch SW1, wire 2x, switch SW2 (still closed) and wire 2. When coil 232 is energized wire 2 is disconnected from wire 3 and is connected with wire 4 thereby causing energization of coil 204 while coil 205 is not energized. Therefore, the spool valve 201 moves left to connect pipe 206 with pipe 208 so that fluid pressure is applied to the top of piston 36 and it moves down to effect the clamping of the tubing and the cutting thereof before the cutter 30 has moved to the right sufficiently to open switch SW2. When SW2 is opened, coil 232 of relay RE2 is deenergized and coil 204 is open circuited and wire 2 is connected with wire 3. Therefore, by the time the cutter blade has moved down sufficiently to cut the tubing, contact 3c of switch SW3 has connected wires 3 and 6 and coil 205 is energized through the following circuit: wire 1, coil 205, wire 6, switch SW3, wire 3, upper contact of relay RE2, wire 2. Therefore, the cutter blade moves up and switch SW3 is caused to disconnect wire 3 from wire 6 whereupon coil 205 is deenergized and wire 3 is connected with wire 7. When this occurs coil 234 of relay RE4 is energized through the following circuit: wire 1, coil 234, wire 7, switch SW3, wire 3, relay RE2, wire 2. Relay RE4 then connects current source wires 11 and 12 with coil 198 so that valve 190 is conditioned to cause pressure fluid to flow from pipe 155 to pipe 191 to the right end of the cylinder 130. Coincidentally, when the tubing has been severed, eject solenoid 120 becomes energized through connections with wires 11a and 12a effected by virtue of energization of coil 233 of relay RE3 which takes place by the closing of switch SW4 at the end of the right movement of cutter 30. Coil 233 is then energized through the following circuit: wire 1, coil 233, switch SW4, wire 7, switch SW3, wire 3, relay RE2, wire 2. The free length of tubing is therefore ejected. Just prior to ejection and coincidentally with the closing of the switch SW4, the lever 88 has been cammed by engagement with rod 95 (Figs. 9 and 12) into position for releasing the stop lever 90. Therefore right movement of T-bar 70 ceases and left movement begins by virtue of the action of spring 135a (Fig. 1) which can pull the pin 135 to the left and lever 136 counterclockwise thereby causing left movement of the T-bar 70 by engagement of pin 63 (Fig. 18) with screw 67. Therefore the cutter and the T-bar start moving left as a unit. However, due to the action of cam 174 upon follower 173, spool valve 156 (Fig. 20) will move faster toward the left than sleeve valve 159. Therefore, there will be relative displacement of valve 156 to the left of valve 159. Therefore, at the time coil 198 of valve 190 is energized so as to connect pipes 155 and 191, valve 150 will be conditioned for connecting pipes 214 and 155. Therefore, the piston 131 will move to the left and cause the spring 135a to be stretched and thereby to pull the lever 136 counterclockwise and the cutter 30 to the left, thereby carrying the cutter and the T-bar back to the normal or starting position corresponding to which the valve 150 is in equilibrium status. As soon as the cutter starts moving left switch SW4 opens and coil 233 of relay RE3 is deenergized and the eject solenoid 120 is deenergized so that the ejector members 100 (Fig. 8) return to normal position to receive the uncut tubing as it moves along the T-bar 70. However, coil 234 of relay RE4 remains energized and coil 198 remains energized so that valve 190 will remain in condition to maintain connection of pipes 155 and 191 so that the cutter 30 will be moved back to starting position. Return of spool valve member 192 of valve 190 is caused by spring 195 when coil 198 is deenergized. Deenergization of coil 198 is caused early in the next cycle when coil 234 of relay RE4 becomes deenergized due to operation of relay RE2 to break connection between wires 2 and 3.

While the embodiment of the present invention as herein disclosed, constitutes a preferred form, it is to be understood that other forms might be adopted.

What is claimed is as follows:

1. Apparatus for cutting tubing into lengths comprising a cutter unit mounted for movement with the tubing and through which the tubing means longitudinally and having a blade movable transversely of the tubing and having means for moving the blade, a tubing support which receives the tubing as it passes from the cutter unit and which is movable with the tubing, an abutment carried by the tubing support and engagable by the tubing whereby the support moves with the tubing, a connection between the support and cutter unit providing lost motion, a spring connecting the support and cutter unit for taking up the lost motion in one direcion so that the support can move a short distance before the cutter unit moves with the support, means rendered effective by initial movement of the support to start movement of the cutter unit at a rate slower than tubing movement and rendered effective by the initial return movement of the support after release of the abutment from engagement by the tubing to return the cutter unit and support to starting position, means for effecting initial return movement of the support after the abutment member has released the tubing, means for causing operation of the blade moving means to cut the tubing and then to retract the blade during movement of the cutter unit with the tubing, a latch carried by the support for retaining the abutment in functioning position, means for causing retraction of the latch in response to further movement of the support whereby the tubing actuates the abutment into non-functioning position and means for causing ejection of the cut tubing.

2. Apparatus for cutting tubing into lengths comprising a cutter unit mounted for movement with the tubing and through which the tubing moves longitudinally, and having a blade movable transversely of the tubing and having means for moving the blade, a tubing support which receives the tubing as it passes from the cutter unit and which is movable with the tubing, an abutment carried by the tubing support and engageable by the tubing whereby the support moves with the tubing, a connection between the support and cutter unit providing lost motion, a spring connecting the support and cutter unit for taking up the lost motion in one direction so that the support can move a short distance before the cutter unit moves with the support, a servo for moving the cutter unit, a servo controller, a mechanism for operating the controller by initial movement of the support by the tubing to cause the servo to move the cutter unit in the direction of tubing movement at a rate less than the rate of tubing movement and for operating the controller, during the first part of return movement of the support, to cause the cutter unit and support to return to starting position, a connection between the servo and cutter unit providing lost motion whereby the cutter unit can move with the tubing independently of the servo and the cutter unit and support can move a distance toward starting position after the support is released from connection with the tubing, means for causing the first part of return movement of the support whereby the servo controller is conditioned for return of the cutter unit and support, means for causing operation of the blade moving means to advance the blade to cut the tubing and to retract the blade while the cutter unit moves with the support, a latch carried by the support for retaining the abutment in functioning position, means for causing retraction of the latch in response to further movement of the support whereby the tubing actuates the abutment into non-functioning position and means for causing ejection of the cut tubing.

3. Apparatus for cutting tubing into lengths comprising a cutter unit mounted for movement with the tubing and through which the tubing moves longitudinally and having a blade movable transversely of the tubing and having means for moving the blade, a tubing support which receives the tubing as it passes from the cutter unit and which is movable with the tubing, an abutment carried by the tubing support and engageable by the tubing whereby the support moves with the tubing, a connection between the support and cutter unit providing lost motion, a spring connecting the support and cutter unit for taking up the lost motion in one direction so that the support can move a short distance before the cutter unit moves with the support, a servo for moving the cutter unit, a controller for the servo causing it to move the cutter unit at a rate slower than the rate of tubing movement, means connected with the support and operating during the initial movement of the support by the tubing to condition the controller for operation of the servo to move the cutter unit in the direction of tubing movement before the lost motion connection is taken up in the direction opposite to that first mentioned whereby the cutter unit is in motion before the support begins moving it, a connection between the servo and the cutter unit providing a second lost motion connection so that the cutter is moved by the support independently of operation of the servo, a second spring which takes up in one direction the lost motion of the second mentioned connection and which yieldingly resists movement of the cutter unit by the tubing, means operating in response to movement of the cutter unit with the support for causing the blade moving means to cause the blade to advance to cut the tubing and then to retract, means normally retaining the abutment in functioning position and rendered ineffective in response to movement of the support following blade return whereby the abutment is moved by the tubing to non-functioning position, a tubing ejector, means for causing operation of the ejector in response to a movement of the cutter unit with the tubing coincidently with retraction of the abutment member, said second mentioned spring becoming effective upon retraction of the abutment member to initiate return of the tubing support toward starting position, said servo controller being conditioned by said initial return movement for causing the servo to return the cutter unit to starting position whereby the return of the support to starting position is effected by the return movement of the cutter unit in conjunction with the first mentioned spring which restores the initial status of the first mentioned lost motion connection.

4. Apparatus according to claim 1 in which the means rendered effective by initial movement of the support to start movement of the cutter unit at a rate slower than tubing movement and rendered effective by the initial return movement of the support after release of the abutment from engagement by the tubing to return the cutter unit and support to starting position, comprises an hydraulic servo cylinder and piston having a lost motion connection with cutter unit, a servo control valve having a spool valve providing spaced lands, having a sleeve valve providing ports normally closed by the lands and an intermediate port and a body providing a fluid pressure inlet duct connected with the intermediate port and distribution ducts connected respectively with the other ports of the sleeve valve and respectively with the ends of the servo cylinder, means connected with the support for controlling the position of the spool valve to cause, in response to initial movement of the support with the tubing flow of pressure fluid from the intermediate port of the sleeve valve to that port which is connected with that end of the cylinder required for effecting movement of the cutter unit in the direction of movement of the tubing, said ports being of such small size that the servo moves the cutter unit at a rate less than the rate of tubing movement, a mechanical connection between the servo piston and the sleeve valve to provide for the movement of the sleeve valve to distribution port closing position at the end of piston travel, said spool valve positioning means operating during the initial return movement of the support, to effect displacement of the spool valve relative to the sleeve valve for the purpose of connecting the fluid pressure inlet duct with the other end of the servo cylinder whereby the cutter unit and support are returned to starting position.

5. Apparatus according to claim 1 in which blade moving means comprises an hydraulic servo cylinder and piston, in which the means for causing operation of the blade moving means comprises a valve for selectively connecting a fluid pressure source with the ends of the cylinder, a first solenoid for conditioning the valve for effecting advancement of the blade to the tubing, a second solenoid for conditioning the valve for effecting retraction of the blade, in which the means for causing ejection of the tubing includes a third solenoid, and in which the control of said solenoids is effected by an electrical system including first, second, third and fourth switches, the first, second and fourth switches being controlled by position of the cutter unit, the third switch being controlled by position of the servo piston, the first switch making a first circuit connection when the cutter unit is at starting position and a second circuit connection when the cutter unit moves from starting position, the second switch being normally closed and opening by movement of the cutter unit when travelling with the tubing, the fourth switch being normally open and closed by movement of the cutter unit with the tubing after the opening of the second switch, the third switch having a first circuit making position when the blade is retracted and a second circuit making position when the blade is advanced to cut the tubing, first, second and third relays having magnet coils current source terminals, a circuit connecting the first relay coil with the terminals and comprising the first switch in first position and the second switch in normal position, a circuit connecting the first relay coil with the terminals after energization of the first relay coil and comprising contacts of the first relay and normally closed contacts of the third relay, a circuit connecting the second relay coil with the terminals and comprising contacts of the first relay, the first switch in second position and the normally closed contacts of the second switch, a circuit connecting the first solenoid with the terminals and including contacts of the second relay when energized, said first solenoid being deenergized when the second switch opens to effect open-circuiting the second relay coil, a circuit for connecting the second solenoid with the terminals and comprising the third switch in second position and contacts of the second relay when deenergized, the second solenoid being deenergized when the third switch returns to first position, a circuit for connecting the third relay coil with the terminals and including the fourth switch when closed, the third switch in first position and contacts of the second relay when deenergized, means for connecting the third solenoid with a current source including contacts of the third relay when energized, energization of the third relay causing its normally closed contacts to open whereby the first relay coil is deenergized, the third relay coil being deenergized when the fourth switch opens in response to the first part of return movement of the cutter unit, the third solenoid being deenergized in response to deenergization of the third relay, and the first relay coil being reenergized when the cutter unit returns to starting position whereby the cycle is repeated when the cutter unit moves in the direction of tubing movement.

6. Apparatus according to claim 1 in which blade moving means comprises an hydraulic servo cylinder and piston, in which the means for causing operation of the blade moving means comprises a valve for selectively connecting a fluid pressure source with the ends of the cylinder, a first solenoid for conditioning the valve for effecting advancement of the blade to the tubing, a second solenoid for conditioning the valve for effecting retraction of the blade, in which the means for causing ejection of the tubing includes a third solenoid, means for preventing operation of the means which returns the cutter unit and support, a fourth solenoid for disabling the preventing means when energized, and in which the control of said solenoids is effected by an electrical system including first, second, third and fourth switches, the first, second and fourth switches being controlled by position of the cutter unit, the third switch being controlled by position of the servo piston, the first switch making a first circuit connection when the cutter unit is at starting position and a second circuit connection when the cutter unit moves from starting position, the second switch being normally closed and opening by movement of the cutter unit when travelling with the tubing, the fourth switch being normally open and closed by movement of the cutter unit with the tubing after the opening of the second switch, the third switch having a first circuit making position when the blade is retracted and a second circuit making position when the blade is advanced to cut the tubing, first, second, third and fourth relays, having magnet coils current source terminals, a circuit connecting the first relay coil with the terminals and comprising the first switch in first position and the second switch in normal position, a circuit connecting the first relay coil with the terminals after energization of the first relay coil and comprising contacts of the first relay and normally closed contacts of the third relay, a circuit connecting the second relay coil with the terminals and comprising contacts of the first relay, the first switch in second position and the normally closed contacts of the second switch, a circuit connecting the first solenoid with the terminals and including contacts of the second relay when energized, said first solenoid being deenergized when the second switch opens to effect open-circuiting the second relay coil, a circuit for connecting the second solenoid with the terminals and comprising the third switch in second position and contacts of the second relay when deenergized, the second solenoid being deenergized when the third switch returns to first position, a circuit for connecting the fourth relay coil with the terminals and including the third switch when in first position and contacts of the second relay when deenergized, means for connecting the fourth solenoid with a circuit source and including contacts of the fourth relay when energized, a circuit for connecting the third relay coil with the terminals and including the fourth switch when closed, the third switch in first position and contacts of the second relay when deenergized, and a circuit for connecting the third solenoid with a current source including contacts of the fourth and third relays when energized, energization of the third relay causing its normally closed contacts to open whereby the first relay coil is deenergized, the third relay coil being deenergized when the fourth switch opens in response to the first part of return movement of the cutter unit, the third solenoid being deenergized in response to deenergization of the third relay, the fourth relay coil being deenergized when the second relay coil is energized and the first relay coil being reenergized when the cutter-unit returns to starting position whereby the cycle is repeated when the cutter unit moves in the direction of tubing movement.

7. Apparatus according to claim 1 in which blade moving means comprises an hydraulic servo cylinder and piston, in which the means for causing operation of the blade moving means comprises a valve for selectively connecting a fluid pressure source with the ends of the cylinder, a first solenoid for conditioning the valve for effecting advancement of the blade to the tubing, a second solenoid for conditioning the valve for effecting retraction of the blade, in which the means for causing ejection of the tubing includes a third solenoid and in which the first solenoid is energized in response to first part of movement of the cutter unit with the tubing and the third solenoid in response to latter part of movement of the cutter with the tubing and in which the second solenoid is energized in response to advancement of the blade to cut the tubing.

BERNARD E. FRANK.
JOHN W. ARMSTRONG.

REFERENCES CITED

The following references are of record in the file of this patent:

UNITED STATES PATENTS

| Number | Name | Date |
|---|---|---|
| 2,205,389 | Borzym | June 25, 1940 |